(12) United States Patent
Zollinger et al.

(10) Patent No.: US 8,234,715 B2
(45) Date of Patent: Jul. 31, 2012

(54) ACTIVATING STREAMING VIDEO IN A BLU-RAY DISC PLAYER

(75) Inventors: Mitch Zollinger, San Jose, CA (US); Chung-ping Wu, Sunnyvale, CA (US)

(73) Assignee: Netflix, Inc., Los Gatos, CA (US)

( * ) Notice: Subject to any disclaimer, the term of this patent is extended or adjusted under 35 U.S.C. 154(b) by 550 days.

(21) Appl. No.: 12/422,649

(22) Filed: Apr. 13, 2009

(65) Prior Publication Data

US 2010/0262833 A1    Oct. 14, 2010

(51) Int. Cl.
*H04L 29/06*    (2006.01)
*H04L 9/32*    (2006.01)

(52) U.S. Cl. .............. 726/29; 726/5; 713/184; 705/52; 380/44

(58) Field of Classification Search ........... 713/150–194
See application file for complete search history.

(56) References Cited

U.S. PATENT DOCUMENTS

| | | | |
|---|---|---|---|
| 6,044,471 A * | 3/2000 | Colvin ................. | 726/28 |
| 6,446,211 B1 * | 9/2002 | Colvin ................. | 726/22 |
| 6,460,142 B1 * | 10/2002 | Colvin ................. | 726/27 |
| 6,484,264 B1 * | 11/2002 | Colvin ................. | 726/18 |
| 6,792,548 B2 * | 9/2004 | Colvin ................. | 726/30 |
| 7,509,495 B2 * | 3/2009 | Roig ................... | 713/168 |
| 7,865,738 B2 * | 1/2011 | Buck et al. ............ | 713/184 |
| 2002/0129262 A1 * | 9/2002 | Kutaragi et al. ........ | 713/193 |
| 2003/0041265 A1 * | 2/2003 | Lagimonier et al. ..... | 713/201 |
| 2005/0005093 A1 * | 1/2005 | Bartels et al. ......... | 713/150 |
| 2006/0085644 A1 * | 4/2006 | Isozaki et al. ......... | 713/171 |
| 2007/0050851 A1 * | 3/2007 | Musha et al. .......... | 726/27 |
| 2007/0143623 A1 * | 6/2007 | Walmsley et al. ....... | 713/176 |
| 2008/0095372 A1 * | 4/2008 | Tobita ................. | 380/278 |
| 2008/0216160 A1 * | 9/2008 | Rollet ................. | 726/6 |

OTHER PUBLICATIONS

International Search Report. PCT/US10/30384 dated Nov. 8, 2010.
AACS Licensing Administration "Advanced Access Content System: Blu-ray Dish Pre-recorded Book, Revision 0.921", Jun. 6, 2008.

* cited by examiner

*Primary Examiner* — Christopher Revak
(74) *Attorney, Agent, or Firm* — Patterson & Sheridan, LLP

(57) ABSTRACT

Techniques are described herein for using cryptographic elements of the Advanced Access Content System (AACS) in a client-server environment to cryptographically authenticate client applications that are executing on non-revoked AACS-compliant playback devices. The techniques described herein may be used to protect a server application from providing information to client applications executing in non-AACS-compliant or revoked environments. In one embodiment, the techniques are used to authenticate a Blu-ray Disc Java Application executing on a non-revoked AACS-compliant Blu-ray Disc Player.

21 Claims, 6 Drawing Sheets

//1

ACTIVATING STREAMING VIDEO IN A BLU-RAY DISC PLAYER

TECHNICAL FIELD

The present disclosure relates generally to cryptographic-based authentication in a client-server environment, and more particularly to cryptographic-based authentication of a client application executing on an Advanced Access Content System (AACS) compliant device communicating with a server application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright © 2009 Netflix, Inc.

BACKGROUND

The Blu-ray Disc Association (BDA) is an industry consortium responsible for establishing format standards and specifications for the Blu-ray Disc media format. For example, the BDA has authored a format specification related to playback of pre-recorded audiovisual programs by Blu-ray Disc playback devices (BD-Players) known generally as the "Blu-ray Disc Read-Only (ROM) Format". Other format specifications authored by the BDA include the "Blu-ray Disc Recordable (R) Format" and the "Blu-ray Disc Rewritable (RE) Format". The BDA format specifications are referred to herein collectively as the Blu-ray Disc Specification, or BD-Specification.

An aspect of the BD-Specification facilitates the development of computer program logic or applications for the Blu-ray Disc Player platform that provide enhanced or interactive content to viewers. These applications are referred to in the BD-Specification as Blu-ray Disc Java Applications, or BD-J Applications. For example, a BD-J Application may be authored that provides, among other things, a picture-in-picture movie commentary or an interactive game to accompany the primary Blu-ray Disc content.

The version of the BD-Specification known as "BD-Live" requires compliant BD-players to implement networking functionality for connecting to a data network, such as the Internet. A BD-J Application executing on a compliant BD-player can use the network capability to download and play back content such as, for example, a full-length motion picture received from a remote server over the Internet. For example, a subscription based content provider may author a BD-J Application that, upon execution by a BD-Player, connects to a server and downloads a list of movie titles that are available for viewing on a pay-per-view basis or as part of a subscription service. The viewer may then select one of the titles from a menu presented on the viewer's television screen whereupon the BD-J Application will download successive portions of the selected movie title from a server and instruct the BD-Player to playback the portions as they are received. In this way, a BD-J Application executing on a BD-Player can provide playback of streaming video downloaded over the Internet or other network.

To protect against unauthorized access to copyrighted content downloaded over a network, BD-Players may implement the Advanced Access Content System (AACS) content protection system. The AACS is a standard for content distribution and digital rights management developed by an industry consortium with the aim of restricting unauthorized access to AACS protected content recorded on removable media (e.g., Blu-ray Discs) or downloaded over a network such as the Internet. The AACS standard includes the following specification books authored by the AACS consortium members: "*Introduction and Common Cryptographic Elements* Revision 0.91 Feb. 17, 2007", "*Pre-recorded Video Book Revision* 0.92 Nov. 29, 2008", and "*Blu-ray Disc Pre-recorded Book Revision* 0.921 Jun. 6, 2008." These books are referred to herein collectively as the AACS Specification.

Content providers that deliver AACS protected content over the Internet and network-enabled playback devices that download AACS protected content may implement a certain encryption/decryption scheme to protect and access content. While AACS may be sufficient to protect against unauthorized access to AACS protected content, AACS does not provide explicit mechanisms for a content provider that delivers AACS protected content over a network to authenticate clients such as playback devices that request content or request other information such as, for example, subscription information like movie viewing history or billing information.

What is needed are techniques in a networked client and server for the server to reliably authenticate client applications that are executing in AACS compliant environments. Ideally, the solution should allow the server to reliably distinguish between client applications that are executing on non-revoked, AACS compliant platforms and client applications that are executing in revoked AACS environments or not executing within an AACS-compliant environment. Further, the solution should allow the server to reliably identify the client with whom the server is communicating such that the server can safely communicate private information to the client. These and other needs are addressed by the invention described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
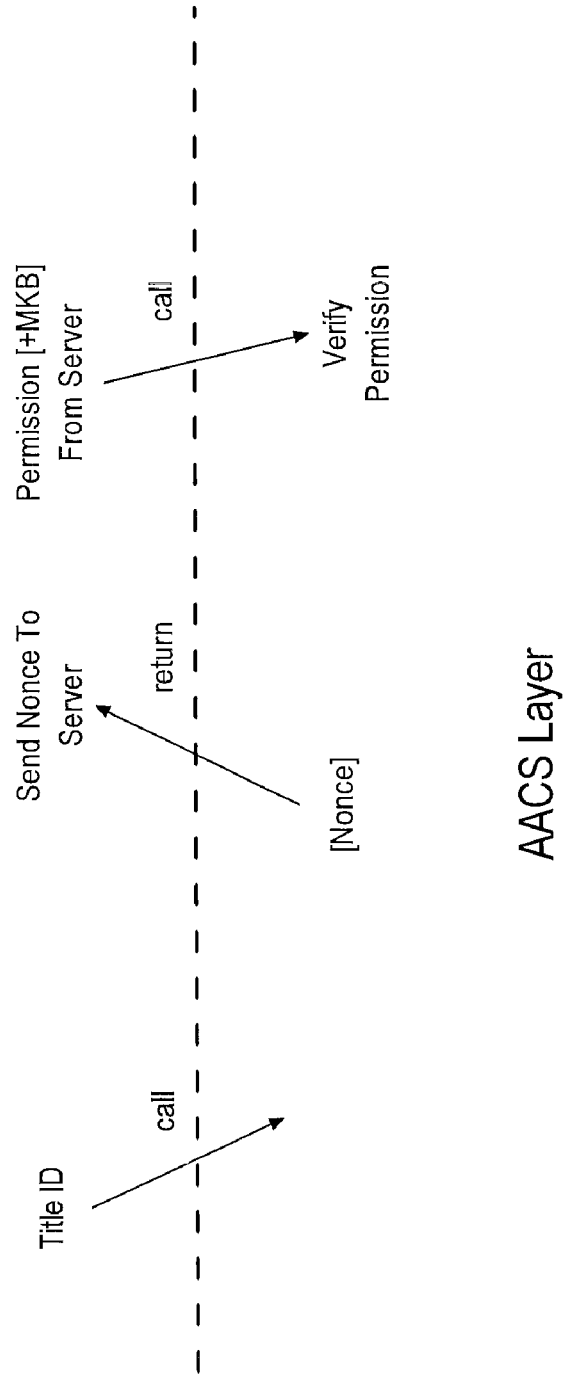
FIG. 1 illustrates a client application's use of an Advanced Access Content System (AACS) API to validate an AACS permission.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Reference in the following description to "one embodiment" or "an embodiment" means that a particular feature, structure, or characteristic described in connection with the embodiment is included in at least one embodiment of the invention. The appearances of the phrase "in one embodiment" or "in an embodiment" in various places in the following description are not necessarily all referring to the same embodiment.

Functional Overview

Techniques are described herein for using cryptographic elements of the Advanced Access Content System (AACS) in a client-server environment to cryptographically authenticate client applications that are executing on non-revoked AACS-compliant playback devices. The techniques described herein may be used to protect a server application from providing information to client applications executing in non-AACS-compliant or revoked environments. In one embodiment, the techniques are used to authenticate a Blu-ray Disc Java Application executing on a non-revoked AACS-compliant Blu-ray Disc Player.

Content Protection with AACS

In general, to protect content such as a feature length movie using AACS, a content provider cryptographically encrypts the content using a secret cryptographic "Title Key" associated with the content. The encrypted content and the Title Key are then provided to a non-revoked AACS-compliant playback device which then decrypts the content using the Title Key before playback.

To prevent access to the content by a revoked or non-compliant playback device, the Title Key itself is encrypted in a manner that allows only non-revoked AACS-compliant playback devices to access the unencrypted form of the Title Key. Specifically, the Title Key itself is cryptographically encrypted using a secret cryptographic "Volume Unique Key. The Volume Unique Key is cryptographically derivable by a non-revoked AACS-compliant playback device based on a "Volume ID" and a secret cryptographic "Media Key".

Typically, the Volume ID and the Media Key are stored on recorded media such as, for example, a Blu-ray Disc, along with the encrypted content and the encrypted Title Key. The secret Media Key is typically contained with a "Media Key Block" issued by the AACS Licensing Administrator (AACS LA). The AACS LA is responsible for licensing AACS technology to manufacturers who wish to market AACS-compliant playback devices to consumers.

The Media Key Block is a component of a subset difference tree key management system used in AACS. The Media Key Block is a data block that provides access to the secret Media Key. The secret Media Key in the MKB can be accessed by any AACS-compliant device having "Device Keys" that have not been revoked by the AACS LA. Like the Media Key Block and secret Media Key, Device Keys are also assigned by the AACS LA to playback device manufacturers to include in each compliant playback device.

To generate the Volume Unique Key which can be used to decrypt the encrypted Title Key, a non-revoked AACS-compliant playback device uses its Device Keys to access the Media Key within the Media Key Block. One the Media Key is obtained from the Media Key Block, the playback device can generate the Volume Unique Key. In one embodiment, a non-revoked AACS-compliant playback device generates a Volume Unique Key by applying an Advanced Encryption Standard (AES)-based cryptographic one way function to a Volume ID obtained from the removable media inserted into the playback device and the Media Key obtained from the Media Key Block.

The Media Key Block is formatted in such a way that allows all compliant playback devices, each using their set of secret Device Keys, to calculate the secret Media Key using a known subset-difference tree approach. With the subset-difference tree approach, if a playback device is compromised in a way that threatens the integrity of the AACS, the AACS LA can issue an updated Media Key Block that causes the compromised playback device to be unable to use the Media Key Block to calculate the correct secret Media Key. In this way, a playback device or a set of playback devices can be "revoked" because without the current Media Key a playback device will not be able to access the unencrypted form of the Title Key necessary to decrypt AACS protected content.

While AACS may be sufficient to protect against unauthorized access to AACS protected content, AACS does not provide explicit mechanisms for a content provider that delivers AACS protected content over a network to reliably authenticate clients that request the content or other information. For example, there is no explicit mechanism provided by AACS that allows a content provider to reliably distinguish between an "authorized" client application executing on a non-revoked AACS-compliant playback device and other "unauthorized" applications executing in non-compliant or revoked environments.

A mechanism to reliably authenticate clients would be useful to a content provider to ensure that it provides subscriber-specific information only to clients that can be reliably associated with a particular subscriber. For example, continuing the subscription based content provider example from above, in addition to developing a BD-J Application that allows a subscriber to select content to download from the content provider, the content provider may wish to develop a BD-J Application that also allows the subscriber to view, on his or her home television screen, private subscription information such as, for example, billing information or a listing of previously watched movies. In such a case, the content provider may wish to ensure that such private information is delivered only to a client that can be reliably associated with the particular subscriber to which the personal information belongs.

Further, a mechanism to reliably distinguish between these environments may also be useful to a content provider to ensure, for example, that the content provider provides AACS protected content only to non-revoked AACS-compliant playback devices.

AACS Permissions

Playback devices that support on-line connections and playback of downloaded AACS protected may implement "AACS Permissions".

An AACS Permission is cryptographic data that specifies whether a playback device is allowed to playback a title that requires an on-line connection to download content associated with the title (also known as an "enhanced title"). As used herein, the term "title", unless otherwise indicated, refers to a particular path through AACS protected content. AACS protected content such as a feature length movie may have more than one path through it and hence more than one title. For example, one title might correspond to the movie as shown in the theaters and another title might correspond to the full-featured version of the movie with some extra scenes.

In one embodiment, an AACS permission may be created by a server during communication between the playback device and the server. For example, the playback device may send a network request to the server that requests to play a certain title and also provides billing information. After verifying the billing information, the server may return an AACS Permission to the playback device which the playback device verifies before playing back the content of the requested title.

AACS Layer

AACS-compliant playback devices that support playback of enhanced titles may implement a specified Application Programming Interface (API) in an AACS Layer of the playback device that allows a client application executing within the playback device to validate AACS Permissions generated by a server. The AACS Layer is a secure layer within a playback device that encapsulates AACS elements of the playback device such as secret Device Keys and cryptographic algorithms used by AACS. The AACS Layer is secure in the sense that client applications executing on the playback device, for example Blu-ray Disc Java Applications, do not have direct access to the AACS elements encapsulated by the layer and must use the AACS Layer API to access the elements.

AACS Permission Validation

FIG. 1 illustrates, at a high-level, a client application's use of the AACS Layer API 100 to validate an AACS Permission. The dashed line in FIG. 1 represents the API between the client application and the AACS Layer in an AACS-compliant playback device. In one embodiment, the client application is a Blu-ray Disc Java Application executing on Blu-ray Disc Player. Validating a permission using the AACS Layer API proceeds generally as follows:

1. The client application executing on an AACS-compliant playback device desires to play an enhanced title (being asked to do by user interaction with the playback device). The client application calls the AACS Layer passing an identifier ("Title ID") of the enhanced title it wants to play.
2. The AACS Layer generates a 128-bit random number ("Permission Nonce") and returns the Permission Nonce to the client application. The client application sends the Permission Nonce to a server together with any other information needed by the server to determine whether permission to the play the enhanced title should be granted such as, for example, the Title ID and billing information.
3. If the server determines that permission should be granted, the server generates a permission using the following cryptographic formula, explained in greater detail below, and sends the permission to the client application.

AES-128E (Kvu, [Permission Nonce]^[Permission Data])

AES-128E—The Advanced Encryption Standard (AES) symmetric block cipher algorithm in Enhanced Codebook mode of operation used with data blocks of 128 bits and keys with lengths of 128 bits.

Kvu—A Volume Unique Key derived from the secret Media Key and a Volume ID.

^—Bit-wise Exclusive-OR (XOR) operation.

[Permission Nonce]—The Permission Nonce generated in Step 2 above.

[Permission Data]—Known or derivable information agreed upon by the AACS Layer and the server such as, for example, a Volume ID or a Title ID. The Permission Data is XORed with the Permission Nonce and the result is encrypted using the Volume Unique Key to generate the permission.

4. Upon receiving the permission from the server, the client application passes the permission to the AACS Layer which validates the permission by calculating its own copy of the permission using the formula in step 3 and comparing the calculated permission with the permission received from the server. If the permission received from the server and the permission calculated by the AACS Layer match, the AACS Layer indicates to the client application that the client application has permission to play the enhanced title.

According to the formula in step 3 above, an AACS permission may be generated by applying the Advanced Encryption Standard (AES) symmetric block cipher algorithm in Electronic Codebook (ECB) mode of operation using a 128-bit Volume Unique Key (Kvu) to encrypt the bit-wise Exclusive-OR (XOR) of the Permission Nonce generated in step 2 and other Permission Data. The format and content of the other Permission Data is agreed upon by the AACS Layer and the server and may include, among other things, information exchanged between the client and the server as part of the permission validation process. In one embodiment, the Permission Data is the result of an XOR of a particular Title Key with the cryptographic hash of the bit-wise concatenation of a particular Volume ID and a particular Title ID. In one embodiment, the particular Title Key is the unencrypted form of a particular Title Key and the particular Volume ID and particular Title ID are obtained from the removable media currently inserted into the playback device such as, for example, a Blu-ray Disc inserted into an AACS-compliant Blu-ray Disc Player.

As explained above, the AACS Layer may obtain the secret Media Key by successfully processing the Media Key Block. Playback devices that have non-revoked Device Keys issued by the AACS LA can access the secret Media Key in the Media Key Block. Therefore, playback devices that have non-revoked Device Keys can generate the Volume Unique Key that is used in the AACS permission formula. Thus, playback devices that have non-revoked Device Keys can validate, in the AACS Layer, an AACS Permission using the AACS permission formula.

Revoking a Playback Device

The Media Key Block may be used to revoke an AACS-compliant playback device's ability to decrypt encrypted title keys. The Media Key Block revocation mechanism can also revoke the playback device's ability to validate an AACS Permission. This is because, as explained previously, successfully validating an AACS Permission requires access to the secret Media Key contained in the Media Key Block.

In one embodiment, to revoke a particular playback device or a group of playback devices, the AACS LA issues a new Media Key Block containing a new secret Media Key. The new Media Key Block can be composed, using the subset difference tree key management system, in such a way that the set of Device Keys used by the particular playback device (or particular group of playback devices such as those made by a particular manufacturer) can no longer access the secret Media Key.

In one embodiment, when a new Media Key Block is issued by the AACS LA, thereafter a content provider generates AACS Permissions based on the new secret Media Key contained in the new Media Key Block. When a client application requests permission to play an enhanced title, the server responds with an AACS Permission generated using the new secret Media Key from the new Media Key Block. In one embodiment, the server also responds with the new Media Key Block so that the playback device can access the new Media Key (provided the playback device is not revoked by the new Media Key Block).

In one embodiment, the client application passes the new Media Key Block to the AACS Layer when validating an AACS Permission. If the playback device upon which the client application is executing has not been revoked by the new Media Key Block, then the AACS Layer can successfully validate the AACS Permission using the new Media Key Block. If, however, the new Media Key Block revokes the Device Keys of the playback device, then the AACS Layer cannot successfully validate the AACS Permission.

While the AACS Permission scheme described above may permit a server to grant or deny permission to an AACS-compliant playback device to play an enhanced title, it does not protect the server from communicating protected information to revoked playback devices or even to client applications developed to "impersonate" an AACS-compliant playback device. For example, a client application could be developed to execute on a desktop computer that does not have an AACS Layer and that "pretends" to validate an AACS Permission before playing back an enhanced title. This application could then request AACS protected content or other information from the server under the guise that it is a non-revoked AACS-compliant playback device with "permission" to play back an enhanced title. Before providing AACS protected content or private information to a client application, it would be useful for the server to authenticate that, in fact, the client application is executing on a non-revoked AACS-compliant playback device.

Using AACS Permissions for Client Authentication

Figure 2:
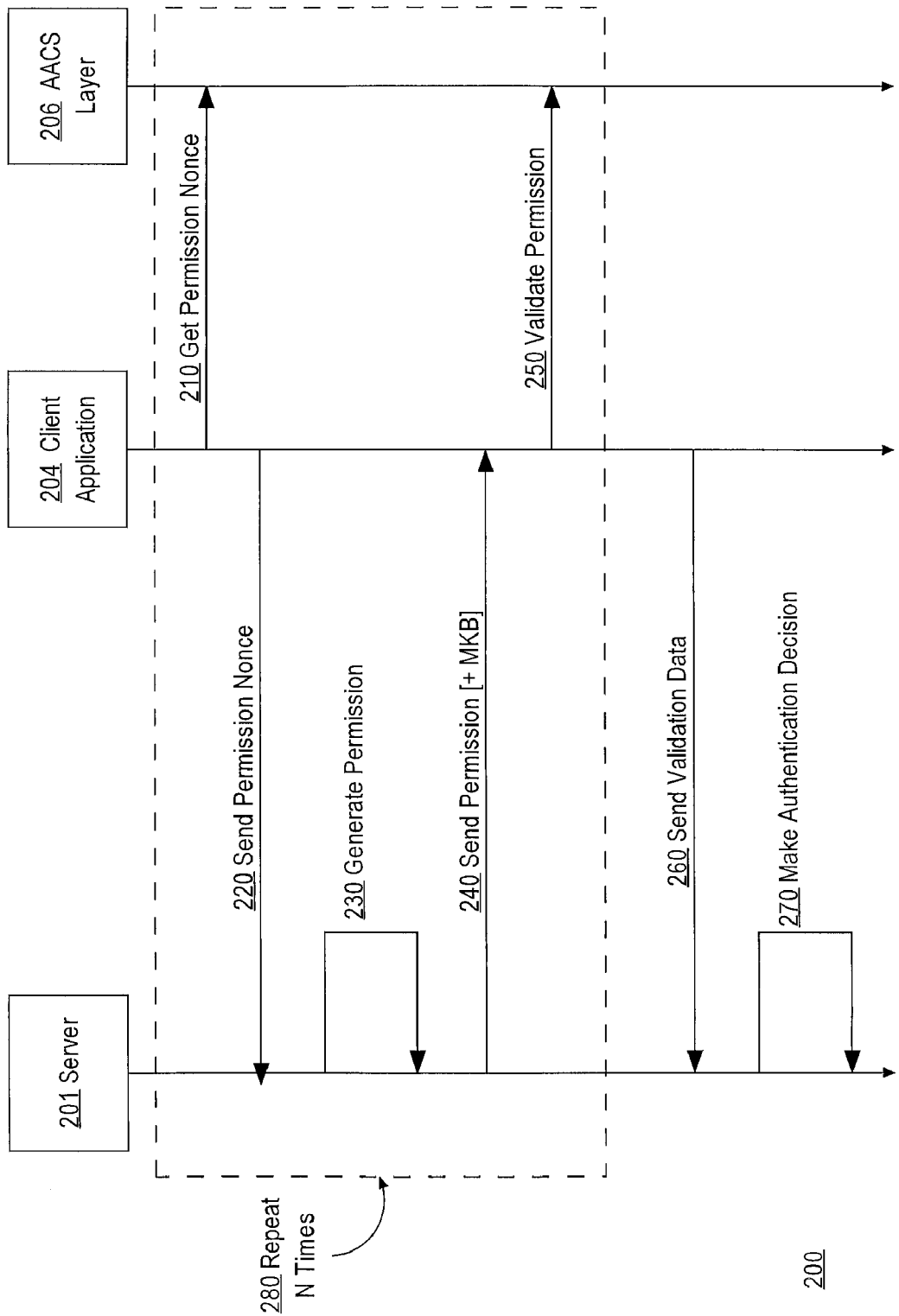
FIG. 2 illustrates authenticating a non-revoked AACS-compliant playback device using AACS permissions.

FIG. 2 is a flowchart that illustrates a process 200 for authenticating a non-revoked AACS-compliant playback device using AACS Permissions, according to an embodiment of the invention. In general, a server may reliably authenticate a non-revoked AACS-compliant playback device by sending, for each of a series of Permission Nonces received from a client application, either (1) a valid permission generated using the AACS Permission formula or (2) a bogus authentication permission which appears to be a valid permission but is not in fact valid. As used herein, the term "authentication permission" refers to both a valid AACS Permission and a bogus permission. The server then observes which of the authentication permissions sent to the client application the client application indicates are valid authentication permissions. Since a non-revoked AACS-compliant playback device can calculate a valid AACS Permission using the AACS Permission formula, a non-revoked AACS-compliant playback device can tell the difference between a valid authentication permission and a bogus authentication permission. If the client application correctly indicates to the server which of the series of authentication permissions are valid authentication permissions then the server has authenticated the client application as executing on a non-revoked AACS-compliant playback device. Otherwise, the server assumes that the client application is executing on a revoked device or in a non-AACS-compliant environment.

Referring to FIG. 2, initially, server 201 assumes that any client application 204 that initiates a communication session with server 201 is unauthenticated. In one embodiment, process 200 is performed before client application 204 attempts to obtain permission from server 201 to play an enhanced title. Both server 201 and client application 204 may comprise one or more sequences of computer-executable instructions which when executed by a processor perform the server-side and client-side of process 200 respectively.

Steps 210, 220, 230, 240, and 250 of process 200 define a loop 280 that is repeated N times by the client application 204 and server 201 with the purpose of generating sufficient authentication data upon which server 201 can make an authentication decision in step 270. For the purpose of discussion, the data upon which server 201 makes an authentication decision in step 270 is referred to herein as "client authentication data."

Three approaches are described for generating client authentication data. However, process 200 is not limited to any particular approach for generating client authentication data and other approaches may be substituted within the spirit and scope of the invention. Further, the three approached described below are not exclusive of one another and may be combined in any combination within the spirit and scope of the invention.

In a first approach for generating client authentication data, server 201 sends a bogus authentication permission in step 240 in each of the first N-1 iterations of loop 280, where N is selected randomly by server 201 and is unknown to client application 204. Then, during the N-th iteration of the loop, server 201 sends a valid authentication permission in step 240. Server 201 authenticates client application 204 based on whether client application 204 ceases to send a Permission Nonce in step 220 following the N-th iteration of the loop. If client application 204 stops sending a Permission Nonce in step 220 prior to the N-th iteration of the loop or sends a Permission Nonce after the N-th iteration, then server 201 determines that the client application 204 is executing on a revoked or non-compliant playback device. If, however, client application 204 stops sending a Permission Nonce in step 220 immediately after the N-th iteration of loop 280, then the server 201 has authenticated client application 204 as executing in a non-revoked AACS-compliant environment. Server 201 makes this authentication decision on the assumption that only a non-revoked AACS-compliant playback device can tell, by validating the authentication permission using the API of AACS Layer 206, that the N-th authentication permission is a valid authentication permission.

In a second approach for generating client authentication data, the value of N is known to both server 201 and client application 204 and server 201 distributes sending bogus authentication permissions and valid authentication permissions in step 240 over the N iterations of loop 280 in a random manner. This effectively creates an N-bit random number that the client application 204 can decipher only by correctly determining when server 201 sent a bogus authentication permission and when server 201 sent a valid authentication permission during the N iterations of the loop.

Continuing the second approach, after the N iterations of loop 280, client application 204, in optional step 260, returns a bit pattern of N-bits representing when client application 204 determined it received a bogus authentication permission and when client application 204 determined it received a valid authentication permission. For example, client application 204 may return an N-bit datum in which the i-th bit is 0 if the client application 204 determined that is received a bogus authentication permission during the i-th iteration of loop 280 and in which the i-th bit is 1 if client application 204 determined that it received a valid authentication permission during the i-th iteration of the loop. Server 201 may authenticate client application 204 in step 270 by comparing the received bit pattern to when it actually sent bogus authentication permissions and valid authentication permissions during the N iterations of the loop.

In a third approach for generating client authentication data, loop 280 is performed once at regular time intervals, for example, once every 2 hours. This approach forces client application 204 to renew authentication over a period of time such as, for example, while the playback device executing client application 204 is powered on and connected to server 201.

In one embodiment, to prevent a malicious client application 204 from causing server 201 to "tell" which of the authentication permissions are valid authentication permissions and which are bogus authentication permissions, server 201 stores up to the last N Permission Nonces sent by client application 204 in step 220. If Client Application 204 repeats a permission nonce as indicated by the Permission Nonces stored by the server, then server 201 may to refuse to authenticate client application 204.

Generating an Authentication Permission

In each of the N iterations of loop 280 of process 200, server 201 generates, in step 230, either a valid authentication permission using the AACS Permission Formula or a bogus authentication permission. For example, during the i-th iteration of the loop, if server 201 determines that a valid authentication permission should be generated according to one of the three approaches described above, then server 201 generates a valid authentication permission using the AACS permission formula and the Permission Nonce received in step 220 during that iteration (i.e., the i-th iteration) of the loop. Alternatively, if server 201 determines that a bogus authentication permission should be generated, then server 201 generates a random number or pseudo-random number of length equal to the length of a valid authentication permission. In one embodiment, both the valid authentication permissions and the bogus authentication permissions are 16-bytes in length.

Authentication of Revoked Playback Devices

If the AACS Licensing Administrator (AACS LA) issues a new Media Key Block (MKB) that revokes Device Keys of an AACS-compliant playback device, server 201 can generate valid authentication permissions using the new Media Key of the new Media Key Block in step 230. In addition to generating authentication permissions using the new Media Key Block, server 201 may send the new Media Key Block containing the new Media Key to client application 204 in step 240. The AACS Layer 206 on an AACS-compliant device using Device Keys revoked by the new Media Key Block will be unable to verify valid authentication permissions sent from server 201. Thus, revoked playback devices will be unable to distinguish between valid authentication permissions and bogus authentication permissions.

In one embodiment, sever 201 sends the current Media Key Block each time it performs step 240 of process 200. In another embodiment, server 201 provides client application 204 with the current Media Key Block in a communication exchange prior to entering the loop of process 200. In one embodiment, client application 204 passes a new Media Key Block received from server 201 to AACS Layer 206 using the AACS Layer API. In one embodiment, client application 204 passes the new Media Key Block to AACS Layer 206 in step 250 when client application 204 requests the AACS Layer 206 to validate an authentication permission.

In some AACS-compliant playback devices, for example, Blu-ray Disc Players, the AACS Layer API does not provide an API so that a client application such as client application 204 can provide a new Media Key Block sent from a server such as server 201. These playback devices only obtain the Media Key Block from removable media currently inserted into the playback device. Accordingly, in one embodiment, when the AACS Licensing Administrator (AACS LA) issues a new Media Key Block, the content provider issues new removable media to content subscribers that include the new Media Key Block. Playback devices using the old Media Key Block and revoked playback devices will be unable to successfully authenticate with server 201.

Exemplary Client-Server Environment

Figure 3:
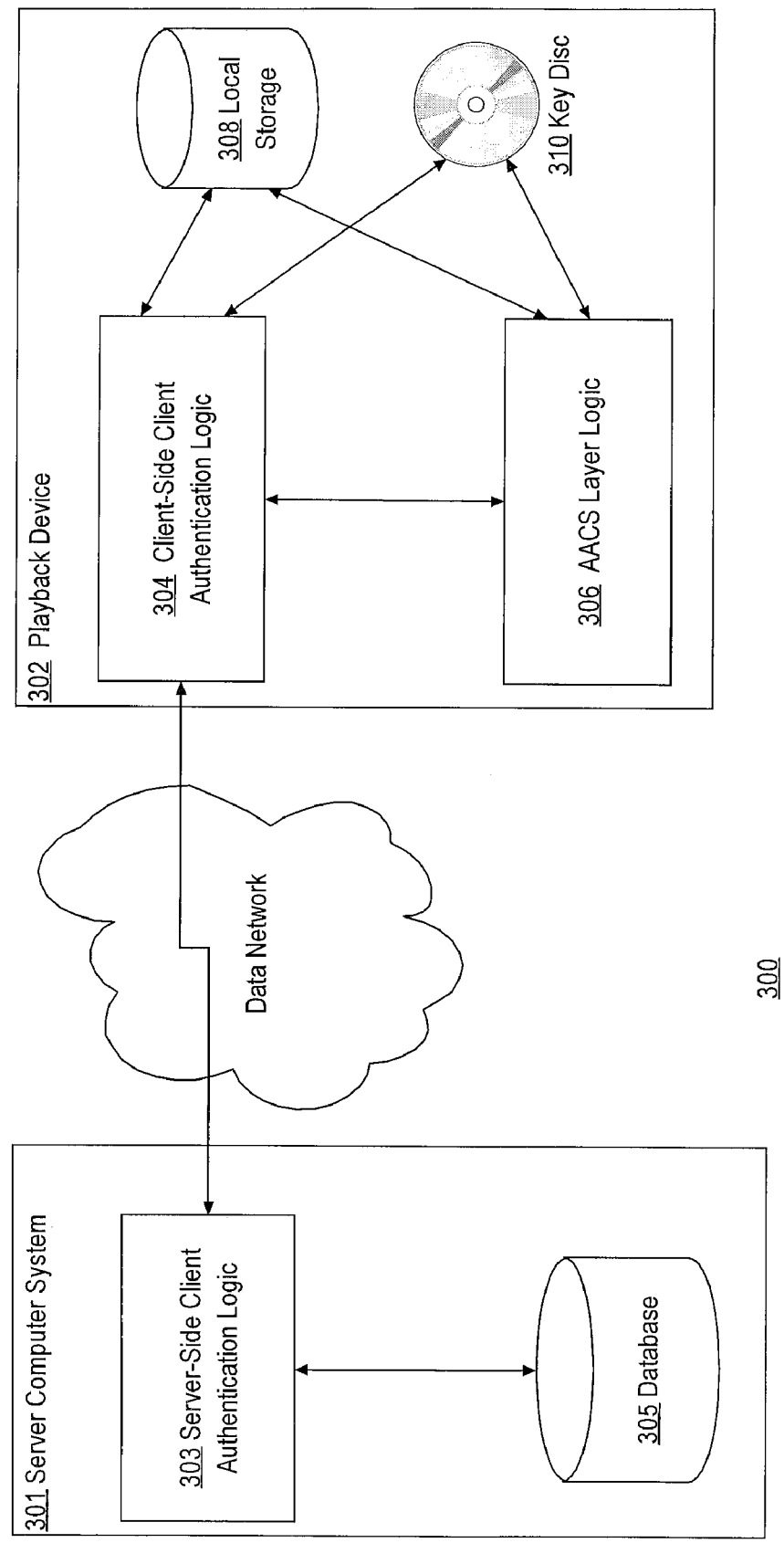
FIG. 3 illustrates a client-server environment.

FIG. 3 illustrates an exemplary client-server environment 300 in which process 200 may be implemented. Environment 300 includes server computer system 301 communicatively coupled to playback device 302 via a data network such as the Internet. Server computer system 301 represents one or more computer systems which are configured to implement server-side client authentication logic 303 and database 305. In one embodiment, server-side client authentication logic 303 implements that server side of process 200. Database 305 maintains data necessary to carry out the server-side steps of process 200. Database 305 may also maintain other data for other applications hosted or implemented by server computer system 301.

Playback device 302 comprises client-side client authentication logic 304, AACS Layer Logic 306, local storage 308, and optionally, subscriber key disc 310 inserted into player 302. For the purpose of illustrating a clear example, FIG. 3 shows one playback device 302, but in a practical embodiment there may be many thousands of playback devices 302 concurrently served by server computer system 301. In one embodiment, playback device 302 is any AACS-compliant playback device that includes AACS Layer Logic 306. In one embodiment, playback device 302 is an AACS-compliant Blu-ray Disc Player.

Each of the server computer system 301, playback device 302, server-side client authentication logic 303, client-side client authentication logic 304, and AACS Layer logic 306 may be implemented in various embodiments using a computer, one or more application-specific integrated circuits (ASICs) or other digital electronic logic, one or more computer programs, modules, objects, methods, or other software elements. For example, in one embodiment, server computer system 301 and playback device 302 may each comprise a special-purpose computer having particular logic configured to implement the respective elements and functions described herein. In another embodiment, server computer system 301 and playback device 302 may comprise a general purpose computer as in FIG. 6, loaded with one or more stored programs with transform the general purpose computer into a particular machine upon loading and execution.

In one embodiment, playback device 302 may have a central processing unit (CPU) for executing instructions of client-side client authentication logic 304. In one embodiment, client-side client authentication logic 304 is implemented as a Blu-ray Disc Java Application. In one embodiment, client-side client authentication logic 304 comprises one or more sequences of computer executable instructions for performing the client-side steps of process 200. In addition, client-side client authentication logic 304 may also comprise instructions for providing various subscription services such as, for example, allowing a subscriber to select, download, and view AACS protected content or manage personal subscription information such as, for example, billing information, personal movie preferences, movie queue information, and the like.

In one embodiment, the instructions comprising client-side client authentication logic 304 are stored on a non-volatile memory of player 302 such as, for example, on a hard disk or flash memory of player 302. In another embodiment, instructions comprising client-side client authentication logic 304 may be read by player 302 from a removable non-volatile computer-readable storage medium inserted into player 302 such as, for example, a Blu-ray Disc. In another embodiment, instructions comprising client-side client authentication logic 304 may be received over data network from a server such as server computer system 301.

In one embodiment, client-side client authentication logic 304 is implemented as two applications: (1) a bootstrap application stored in the firmware of player 302 or on a Blu-ray Disc which, when executed by player 302, contacts a server to download the latest version of (2) the second application that comprises the most up-to-date instructions for performing the client-side steps of process 200.

In one embodiment, AACS Layer Logic 306 is a secure AACS-compliant sub-system of player 302 that provides the AACS Layer API as described in the AACS specification.

Local storage or memory 308 is a hard disk or flash memory for storing files; including AACS protected content downloaded from servers.

Subscriber Key Disc

As explained above, AACS Layer Logic 306 uses a Volume ID when generating the Volume Unique Key. Also as explained above, the Volume Unique Key is used by both the server and client in the AACS permission formula when generating and validating permissions respectively. In one embodiment, the Volume ID is assigned by a content provider to AACS protected content to uniquely identify a title or a set of titles.

In one embodiment, to successfully validate a valid authentication permission, AACS Layer Logic 306 may use the same Volume ID that server-side client authentication logic 303 used to generate the valid authentication permission. AACS Layer Logic 306 in a Blu-ray Disc Player, when generating the Volume Unique Key, may obtain the Volume ID from the Blu-ray Disc currently inserted into the player such as, for example, subscriber key disc 310 inserted into player 302 of FIG. 3. Further, the Volume ID may be stored on the Blu-ray Disc in a way that cannot be duplicated by consumer Blu-ray recording devices so as to prevent indiscriminate copying of Blu-ray Discs. To prevent indiscriminate copying, the Volume ID may be stored in the Burst Cutting Area of the Blu-ray Disc. The Burst Cutting Area is a special area of a Blu-ray Disc that can only be recorded with data using a specialized expensive laser that is generally not commercially available.

In addition to the Volume ID, the Burst Cutting Area of Blu-ray Discs may also contain a Pre-recorded Media Serial Number (PMSN). The PMSN recorded on a Blu-ray Disc may be a 128-bit number of which 104 of those bits may be unique. The Volume ID may not be unique for each Blu-ray Disc as the Volume ID is typically associated with an AACS title or set of titles independent of the medium the content of the title or titles is stored on. However, the PMSN may be unique for each Blu-ray Disc. The AACS Layer API on AACS-compliant Blu-ray Players may provide an interface for a client application such as client-side client authentication logic 304 to obtain the Volume ID and the PMSN from the currently inserted Blu-ray Disc.

In one embodiment, a content provider uses information recorded in the Burst Cutting Area of Blu-ray Discs to aid the content provider in registering subscribers for services. In the embodiment, the content provider provides a Blu-ray Disc ("subscriber key disc") to each subscriber. Each key disc contains a unique key disc identifier in the 104 bit portion of the PMSN. At least two particular features of the PMSN make using the PMSN especially suitable for use in registering subscribers. First, 104 bits of the 128-bit PMSN may contain a random number assigned by the content provider making guessing a subscriber identifier difficult as there would be $2^{104}$ or $2.02824096 \times 10^{31}$ different possible key disc identifiers. Second, since the PMSN is recorded in the Burst Cutting Area of a Blu-ray Disc which cannot be copied without specialized expensive equipment, a subscriber or other person in possession of a subscriber key disc cannot practically make indiscriminate copies of a key disc to gift or sell to others.

Activating Streaming Video in a Blu-Ray Disc Player Using Subscriber Key Discs

Figure 4:
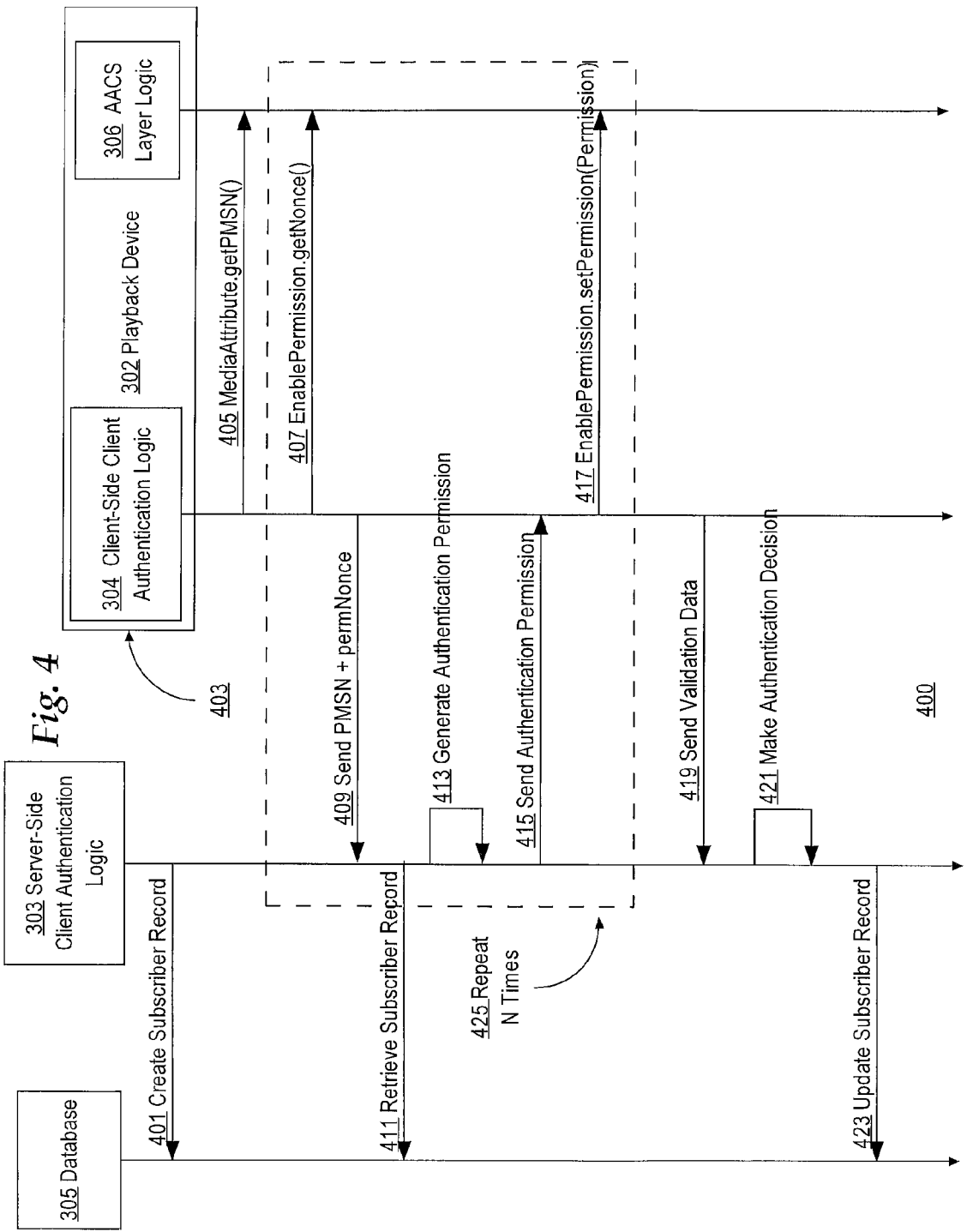
FIG. 4 illustrates a process for activating streaming video in a Blu-ray Disc Player.

FIG. 4 is a flow diagram that illustrates a process 400 for activating streaming video in a Blu-ray Disc Player using the client authentication process 200 of FIG. 2 and s subscriber key disc according to an embodiment of the invention. Process 400 is an example of a practical embodiment of the invention in which a subscription-based content provider authenticates subscriber-owned Blu-ray Disc Players connected to the content provider through a data network such as the Internet. Process 400 is merely an example of a practical embodiment of the invention and should be regarded in an illustrative rather than a restrictive sense.

In one embodiment, process 400 begins with the content provider generating one or more key discs 310 that include computer-executable instructions comprising a Blu-ray Disc Java (BD-J) Application or bootstrap code for obtaining instructions of BD-J Application from a server such as server 301 of FIG. 3. In addition, each key disc 310 contains in the Burst Cutting Area a Pre-Recorded Media Serial Number (PMSN) and a Volume Identifier (Volume ID). The Volume ID may or may not be unique for each key disc at the content provider's discretion.

For each key disc, a portion of the PMSN may contain a unique random number up to 104 bits in length. In one embodiment, the content provider places a unique key disc identifier in the 104 bit portion of the PMSN that uniquely identifies each generated key disc. In one embodiment, each unique key disc identifier comprises a disc identifying portion and a keying material portion. In another embodiment, the unique key disc identifier does not comprise a keying material portion and keying material data is stored in the Burst Cutting Area of the key disc separately from the PMSN. When communicating with server logic 303, client logic 304 sends the disc identifying portion to uniquely identify the key disc currently inserted into playback device 302. In one embodiment, the key material portion is used by client logic 304 for cryptographic message authentication (e.g., as a key for calculating a Hash Message Authentication Code) when communicating with server logic 303.

In step 401, a subscriber record is created in database 305 for generated key discs. Each subscriber record may be uniquely identifiable by the key disc identifier of the corresponding key disc. Further, when created, the subscriber record may be set to an initial state such as, for example, "unregistered" that indicates that no attempt has been made as of yet to use the corresponding key disc to activate streaming video in a Blu-ray Disc Player. Optionally, each subscriber record may contain data that is unique to, or is to be associated with, the key disc identifier recorded in the corresponding key disc. For example, if the content provider chooses to create key discs with unique Volume IDs, then each subscriber record in database 305 may contain the Volume ID recorded into the Burst Cutting Area of the corresponding key disc. In addition, any information that is useful to associate with the key disc identifier such as, for example, any information needed by server-side client authentication logic 303 to generate a valid AACS Permission for a particular key disc, may also be stored in a subscriber record to be associated with the particular key disc.

In step 403, a subscriber receives a key disc containing a unique key disc identifier. The subscriber inserts the key disc into playback device 302, and powers-on the player 302. This causes player 302 to begin execution of client logic 304.

While step 401 is shown in the embodiment depicted in FIG. 4 as being performed prior to step 409, in one embodiment, step 401 is performed after step 409. In particular, in one embodiment, a subscriber record is created when client 304 contacts server 303 in step 409 for the first time after receiving a key disc in step 403.

In step 405, client logic 304 invokes the AACS Layer API of AACS Layer Logic 306 to obtain the Pre-recorded Serial Number (PMSN) of the currently inserted key disc. The notation "MediaAttribute.getPMSN( )" of step 405 in FIG. 4 is pseudo-code that refers to a function call of the getPMSN( ) function on an instance of the MediaAttribute class of the object-oriented AACS Layer API in a Blu-ray Disc Player. The AACS Layer API of AACS Layer Logic 306 in Blu-ray Disc Players is described in detail in Chapter 4 of the *Blu-ray Disc Pre-recorded Book* of the AACS Specification. Steps 407 and 417 of FIG. 4 contain similar notation to that of step 405 and also refer to a function call on an instance of a class of AACS Layer API of AACS Layer Logic 306.

Steps 407, 409, 413, 415, and 417 of process 400 generally correspond to steps 210, 220, 230, 240, and 250 of process 200 respectively except that in step 409, client logic 304 sends the PMSN (or the key disc identifying portion thereof) obtained from the inserted key disc to server 303 along with the Permission Nonce obtained from AACS Layer logic 306 in step 407. Step 419 corresponds generally to step 260 of process 200 and step 421 corresponds generally to step 270 of process 200.

In optional step 411, server-side client authentication logic 303 can use the PMSN (or the key disc identifying portion thereof) sent from BD-J Application 304 in step 409 to retrieve the subscriber record from database 305 that corresponds to the key disc identifier contained within the PMSN. In one embodiment, data in the retrieved subscriber record such as, for example, a Volume ID, is used by server-side client authentication logic 303 in step 413 to generate an authentication permission. In one embodiment, server-side client authentication logic 303 in step 411 retrieves the subscriber record during the first iteration of the client authentication loop 425 to determine whether the key disc as identified by the key disc identifier received in step 409 has already attempted to activate streaming video. In one embodiment, step 411 is performed once during the first iteration of loop 425.

In step 421, server-side client authentication logic 303 makes an authentication decision based on client authentication data generated by the execution of loop 425.

In step 423, server-side client authentication logic 303 updates the subscriber record based on the authentication decision made in step 421. For example, if in step 421 server-side client authentication logic 303 determines that client application 304 is not authenticated (e.g., is not executing on a non-revoked AACS-compliant Blu-ray Disc Player), then server-side client authentication logic 303 may update the subscriber record to indicate that BD-J Application 304 is not authenticated and should not receive other service data from server 301. Such service data may include, for example, history data about previously watched movies or billing information associated with a subscriber.

However, if in step 421 server-side client authentication logic 303 determines that client logic 304 is authenticated, then server-side client authentication logic 303 may update the subscriber record to indicate that client logic 304 is authenticated and is permitted to receive service data from server 301 such as, for example, streaming video content, content viewing history, billing information, and the like. Additionally, server-side client authentication logic 303 or other applications executing on server 301 may use the key disc identifier to ensure that sensitive subscriber-specific data such as, for example, billing information, is sent only to an authenticated client logic 304 that has proven ownership of a valid key disc identifier. In one embodiment, ownership of a valid key disc identifier is "proven" by client logic 304 having been successfully authenticated by server-side client authentication logic 303 according to process 400.

Key Disc/Device Subscriber Binding

In process 400 depicted by FIG. 4, each subscriber is uniquely identified by a key disc identifier stored in the key disc issued to the subscriber. This implies that server 303 can authenticate client 304 executing on more than one playback device 302. For example, a subscriber might have multiple playback devices in a home such as, for example, one in the living room and one in the bedroom. The key disc may be used in any of the home's multiple playback devices to authenticate client 304 and obtain subscription services. However, the content provider may wish to restrict the number of playback devices that the subscriber may use. For example, a content provider may wish to prevent a subscriber from allowing non-subscribers to obtain subscription services by borrowing the subscriber's key disc to use in their own playback devices.

Figure 5:
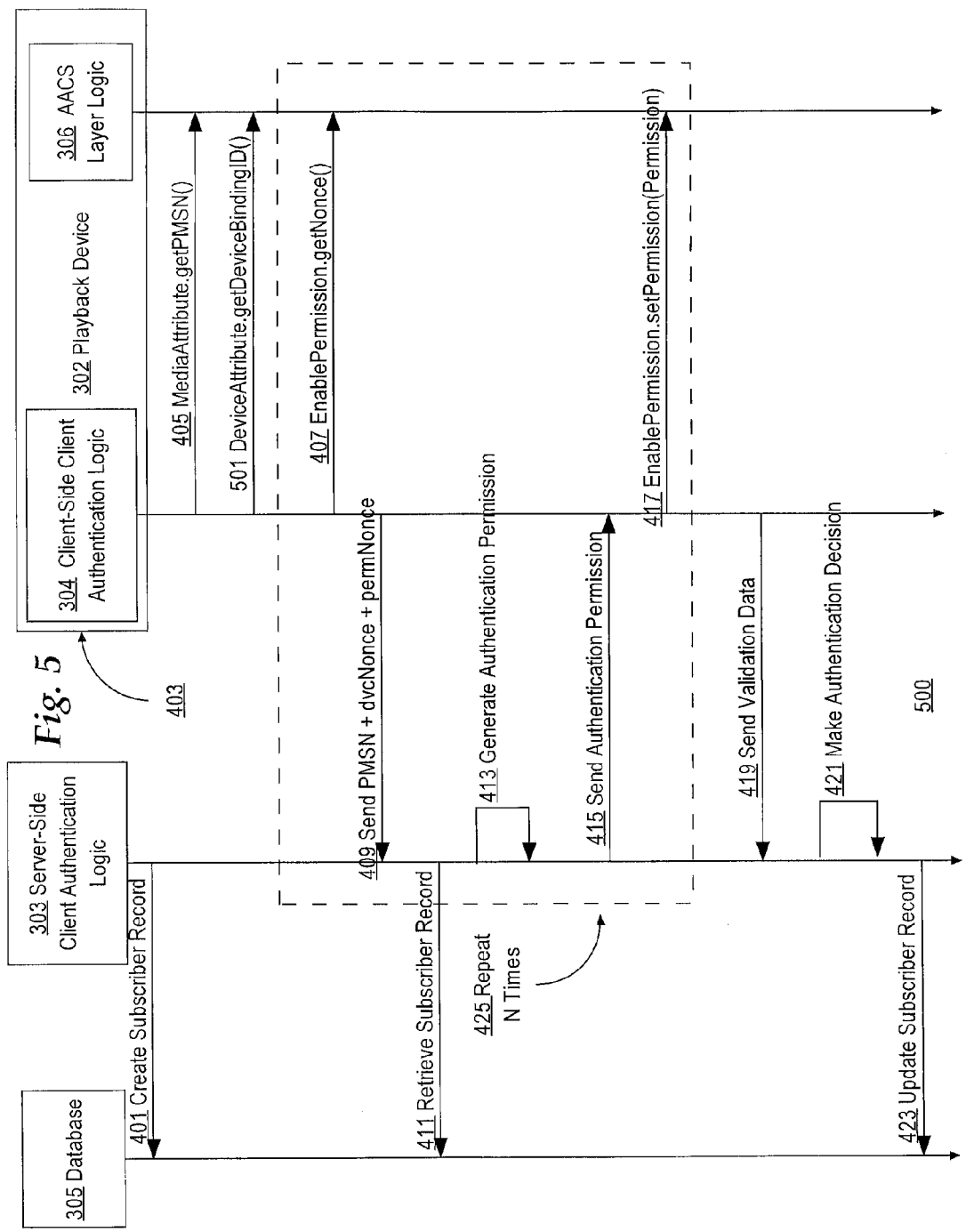
FIG. 5 illustrates a process for activating streaming video in a Blu-ray Disc Player.

Accordingly, FIG. 5 is a flow diagram that illustrates a process 500 for activating streaming video in a Blu-ray Disc Player in which the subscriber record is bound to a key disc and a specified number of play back devices. Process 500 proceeds generally as process 400 depicted in FIG. 4 except that in new step 501 of process 500, client logic 304 calls the AACS layer API function "DeviceAttribute.getBindingID( )" which returns a value that uniquely identifies playback device 302. In one embodiment, the value is a random number 16-bytes in length. Further, in step 409 of process 500, client logic 304 sends to server 303 the device binding value along with the PMSN (or the key disc identifying portion thereof) obtained from the inserted key disc and the Permission Nonce obtained from AACS Layer logic 306 in step 407.

Server 303 may use the unique device binding value to track the number of different playback devices 302 in which a particular key disc has been used to activate streaming video. Through this tracking, the content provider may limit the number of different playback devices 302 that can be activated to receive subscription services by the particular key disc. In one embodiment, the subscriber record created in step 401 is uniquely identified by the PMSN (or the key disc identifying portion thereof) and also stores one or more device binding identifiers received in step 409 to aid server 303 in tracking the number of different playback devices 302 for which a particular key disc has been used to activate streaming video.

Revocation Using Subscriber Key Discs

In one embodiment, when the AASC LA issues a new Media Key Block, the content provider generates new key discs each with unique PMSNs containing the new Media Key Block and sends the new key discs to current subscribers and all future subscribers. Thereafter, server logic 303, in step 413 of process 400 and process 500, generates valid authentication permissions using the new Media Key Block. Players 302 using a key disc with an old Media Key Block will not be able to successfully authenticate with server 303 which is now using the new Media Key Block to generate valid authentication permissions. In one embodiment, server logic 303 refuses to authenticate any client 304 that presents in step 409 a PMSN (or the key disc identifying portion thereof) that indicates that a key disc with an old Media Key Block is inserted into the playback device 302.

Pseudo-Code for BD-J Application

In this section, a pseudo-code example is given of how a content provider might actually design client logic 304 as a Blu-ray Disc Java Application for activating streaming video in a Blu-ray Disc Player. However, it should be noted that the syntax, operators, etc. used in this example is merely exemplary. The actual language, format, syntax for designing client logic 304 may vary from implementation to implementation.

For the purpose of illustration, the pseudo-code illustrates how client logic 304 as a Blu-ray Disc Java Application would accomplish client authentication using AACS permissions according to one embodiment of the invention.

```
// get PMSN
MediaAttribute mAttr = new MediaAttribute( );
byte[ ] pmsn = mAttr.getPMSN( );
// get Device Binding Nonce
DeviceAttribute dAttr = new DeviceAttribute( );
byte[ ] deviceBindingNonce = dAttr.getDeviceBindingID( );
// loop until we get a success
boolean ok = false;
// TBD: deal with max retries
while(! ok) {
    // create an AACS permission
    EnablePermission p = new EnablePermission(title_id);
    byte[ ] permissionNonce = p.getNonce( );
    // client retrieves permission from the server over HTTPS
    HttpsConnection conn = (HttpsConnection)Connector.open(url);
    // send POST containing: pmsn, deviceBindingNonce and
    permissionNonce
    // ...
    // get InputStream to read response
    InputStream is = conn.openInputStream( );
    // etc...
    byte[ ] permission = is.read( );
    // Bind using returned AACS permission
    p.setPermission(permission)
    ok = p.checkPermission( );
}
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
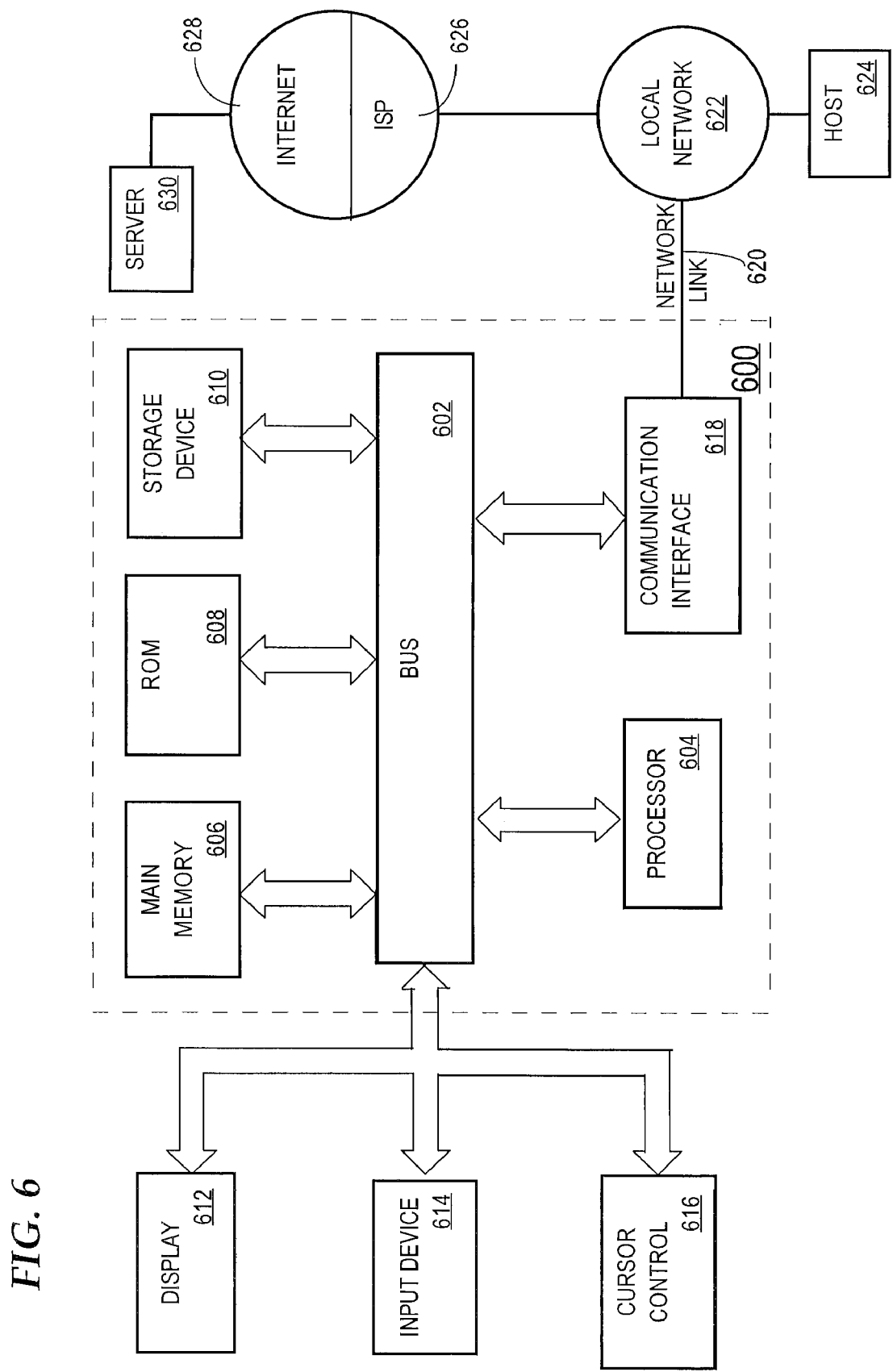
FIG. 6 is a block diagram of a computer system that may be used in an embodiment.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for authenticating a client computer system using Advanced Access Content System (AACS) cryptographic elements, the method comprising:
   receiving a plurality of permission nonces from the client computer system;
   in response to receiving the plurality of permission nonces, generating a plurality of authentication permissions that includes a first set of valid authentication permissions, wherein each authentication permission corresponds to a different permission nonce included in the plurality of permission nonces, and each valid authentication permission is generated based on an Advanced Access Content System (AACS) cryptographic key and a corresponding permission nonce;
   transmitting the plurality of authentication permissions to the client computer system;
   receiving validation data from the client computer system that indentifies one or more authentication permissions included in the plurality of authentication permissions that the client computer system has determined to be valid; and
   authenticating the client computer system only when each of the one or more authentication permissions matches a different valid authentication permission included in the first set of valid authentication permissions.

2. The method of claim 1, wherein the client computer system comprises a Blu-ray Disc Java Application executing on a Blu-ray Disc Playback Device.

3. The method of claim 1, wherein the cryptographic key is a volume unique key generated based on a volume identifier and an Advanced Access Content System media key.

4. The method of claim 1, further comprising:
   storing the plurality of permission nonces;
   determining whether any of the plurality of permission nonces are duplicates, wherein authenticating the client computer system is based at least in part on determining whether any of the plurality of permission nonces are duplicates.

5. The method of claim 1, further comprising:
receiving a disc identifier that uniquely identifies a removable optical disk inserted into the client computer system; and
using the disc identifier to determine whether said removable optical disk has been previously used for authenticating a client computer system.

6. The method of claim 1, further comprising:
receiving a disc identifier that uniquely identifies a removable optical disk inserted into the client computer system;
receiving a device identifier that uniquely identifies the client computer system; and
using said disc identifier and the device identifier to determine whether the removable optical disk has been previously used in the client computer system for authenticating a client computer system.

7. The method of claim 1, wherein the client computer system generates the validation data by determining whether each authentication permission included in the plurality of authentication permissions was generated using the AACS cryptographic key and at least one of the permission nonces included in the plurality of permission nonces.

8. A non-transitory computer readable medium storing instructions that, when executed by a processor, cause the processor to authenticate a client computer system using Advanced Access Content System (AACS) cryptographic elements, the method comprising:
receiving a plurality of permission nonces from the client computer system;
in response to receiving the plurality of permission nonces generating a plurality of authentication permissions that includes a first set of valid authentication permissions, wherein each authentication permission corresponds to a different permission nonce included in the plurality of permission nonces, and each valid authentication permission is generated based on an Advanced Access Content System (AACS) cryptographic key and a corresponding permission nonce;
transmitting the plurality of authentication permissions to the client computer system;
receiving validation data from the client computer system that indentifies one or more authentication permissions included in the plurality of authentication permissions that the client computer system has determined to be valid; and
authenticating the client computer system only when each of the one or more authentication permissions matches a different valid authentication permission included in the first set of valid authentication permissions.

9. The computer readable medium of claim 8, wherein the client computer system comprises a Blu-ray Disc Java Application executing on a Blu-ray Disc Playback Device.

10. The computer readable medium of claim 8, wherein the cryptographic key is a volume unique key generated based on a volume identifier and an Advanced Access Content System media key.

11. The computer readable medium of claim 8, further comprising:
storing the plurality of permission nonces;
determining whether any of the plurality of permission nonces are duplicates,
wherein authenticating the client computer system is based at least in part on determining whether any of the plurality of permission nonces are duplicates.

12. The computer readable medium of claim 8, further comprising:
receiving a disc identifier that uniquely identifies a removable optical disk inserted into the client computer system; and
using the disc identifier to determine whether said removable optical disk has been previously used for authenticating a client computer system.

13. The computer readable medium of claim 8, further comprising:
receiving a disc identifier that uniquely identifies a removable optical disk inserted into the client computer system;
receiving a device identifier that uniquely identifies the client computer system; and
using said disc identifier and the device identifier to determine whether the removable optical disk has been previously used in the client computer system for authenticating a client computer system.

14. The computer readable medium of claim 8, wherein the client computer system generates the validation data by determining whether each authentication permission included in the plurality of authentication permissions was generated using the AACS cryptographic key and at least one of the permission nonces included in the plurality of permission nonces.

15. A computer system, comprising:
a memory; and
a processor configured to:
receive a plurality of permission nonces from the client computer system;
in response to receiving the plurality of permission nonces, generate a plurality of authentication permissions that includes a first set of valid authentication permissions, wherein each authentication permission corresponds to a different permission nonce included in the plurality of permission nonces, and each valid authentication permission is generated based on an Advanced Access Content System (AACS) cryptographic key and a corresponding permission nonce,
transmit the plurality of authentication permissions to the client computer system,
receive validation data from the client computer system that indentifies one or more authentication permissions included in the plurality of authentication permissions that the client computer system has determined to be valid, and
authenticate the client computer system only when each of the one or more authentication permissions matches a different valid authentication permission included in the first set of valid authentication permissions.

16. The computer system of claim 15, wherein the client computer system comprises a Blu-ray Disc Java Application executing on a Blu-ray Disc Playback Device.

17. The computer system of claim 15, wherein the cryptographic key is a volume unique key generated based on a volume identifier and an Advanced Access Content System media key.

18. The computer system of claim 15, wherein the processor is further configured to:
store the plurality of permission nonces;
determine whether any of the plurality of permission nonces are duplicates,
wherein authenticating the client computer system is based at least in part on determining whether any of the plurality of permission nonces are duplicates.

19. The computer system of claim 15, wherein the processor is further configured to:

receive a disc identifier that uniquely identifies a removable optical disk inserted into the client computer system; and using the disc identifier to determine whether said removable optical disk has been previously used for authenticating a client computer system.

20. The computer system of claim 15, wherein the processor is further configured to:

receive a disc identifier that uniquely identifies a removable optical disk inserted into the client computer system;

receive a device identifier that uniquely identifies the client computer system; and use said disc identifier and the device identifier to determine whether the removable optical disk has been previously used in the client computer system for authenticating a client computer system.

21. The computer system of claim 15, wherein the client computer system generates the validation data by determining whether each authentication permission included in the plurality of authentication permissions was generated using the AACS cryptographic key and at least one of the permission nonces included in the plurality of permission nonces.

* * * * *